(12) United States Patent
Bennett et al.

(10) Patent No.: US 8,146,078 B2
(45) Date of Patent: Mar. 27, 2012

(54) TIMER OFFSETTING MECHANISM IN A VIRTUAL MACHINE ENVIRONMENT

(75) Inventors: Steven M. Bennett, Hillsboro, OR (US); Gilbert Neiger, Portland, OR (US); Andrew V. Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1390 days.

(21) Appl. No.: 10/976,970

(22) Filed: Oct. 29, 2004

(65) Prior Publication Data

US 2006/0130059 A1    Jun. 15, 2006

(51) Int. Cl.
G06F 9/455 (2006.01)
G06F 1/12 (2006.01)
G06F 9/46 (2006.01)

(52) U.S. Cl. ............ 718/1; 718/100; 718/102; 718/104; 713/400

(58) Field of Classification Search .............. 718/1, 100, 718/101, 102, 105, 108, 107, 104; 370/507–508, 370/350; 713/400
See application file for complete search history.

(56) References Cited

U.S. PATENT DOCUMENTS

| | | | |
|---|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |

(Continued)

FOREIGN PATENT DOCUMENTS

DE    4217444    12/1992

(Continued)

OTHER PUBLICATIONS

Berg, Cliff, "How Do I Create a Signed Applet?", *Dr. Dobb's Journal*, (Aug. 1997),1-9.

(Continued)

*Primary Examiner* — Emerson Puente
*Assistant Examiner* — Willy W Huaracha
(74) *Attorney, Agent, or Firm* — Blakely, Sokoloff, Taylor & Zafman LLP

(57) ABSTRACT

In one embodiment, a method includes receiving a request to transition control to a virtual machine (VM) from a virtual machine monitor (VMM), calculating an offset value, receiving, during operation of the VM, a request for a current value of the timer, adjusting the current value of the timer based on the offset value, and providing the adjusted timer value to the VM.

16 Claims, 5 Drawing Sheets

U.S. PATENT DOCUMENTS

| | | | |
|---|---|---|---|
| 4,825,052 A | 4/1989 | Chemin et al. | |
| 4,907,270 A | 3/1990 | Hazard | |
| 4,907,272 A | 3/1990 | Hazard | |
| 4,910,774 A | 3/1990 | Barakat | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Holtey et al. | |
| 5,295,251 A | 3/1994 | Wakui et al. | |
| 5,317,705 A | 5/1994 | Gannon et al. | |
| 5,317,754 A | 5/1994 | Blandy et al. | |
| 5,319,760 A | 6/1994 | Mason et al. | |
| 5,361,375 A | 11/1994 | Ogi | |
| 5,381,535 A | 1/1995 | Gum et al. | |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A | 4/1996 | Onodera | |
| 5,511,217 A | 4/1996 | Nakajima et al. | |
| 5,522,075 A | 5/1996 | Robinson et al. | |
| 5,528,231 A | 6/1996 | Patarin | |
| 5,533,126 A | 7/1996 | Hazard et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubala | |
| 5,566,323 A | 10/1996 | Ugon | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,636,373 A * | 6/1997 | Glendening et al. | 713/400 |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,890,189 A | 3/1999 | Nozue et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,944,821 A | 8/1999 | Angelo | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo et al. | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,128,318 A * | 10/2000 | Sato | 370/503 |
| 6,131,166 A | 10/2000 | Wong-Insley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,209,106 B1 * | 3/2001 | Kubala et al. | 713/500 |
| 6,212,635 B1 | 4/2001 | Reardon | |
| 6,222,923 B1 | 4/2001 | Schwenk | |
| 6,249,872 B1 | 6/2001 | Wildgrube et al. | |
| 6,252,650 B1 | 6/2001 | Nakamura | |
| 6,269,392 B1 | 7/2001 | Cotichini et al. | |
| 6,272,533 B1 | 8/2001 | Browne | |
| 6,272,637 B1 | 8/2001 | Little et al. | |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | |
| 6,301,646 B1 | 10/2001 | Hostetter | |
| 6,308,270 B1 | 10/2001 | Guthery et al. | |
| 6,314,409 B2 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng | |
| 6,339,816 B1 | 1/2002 | Bausch | |
| 6,357,004 B1 | 3/2002 | Davis | |
| 6,363,485 B1 | 3/2002 | Adams | |
| 6,374,286 B1 | 4/2002 | Gee et al. | |
| 6,374,317 B1 | 4/2002 | Ajanovic et al. | |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1 | 10/2002 | Drews | |
| 6,463,537 B1 | 10/2002 | Tello | |

| | | | |
|---|---|---|---|
| 6,499,123 | B1 | 12/2002 | McFarland et al. |
| 6,505,279 | B1 | 1/2003 | Phillips et al. |
| 6,507,904 | B1 | 1/2003 | Ellison et al. |
| 6,529,909 | B1 | 3/2003 | Bowman-Amuah |
| 6,535,988 | B1 | 3/2003 | Poisner |
| 6,557,104 | B2 | 4/2003 | Vu et al. |
| 6,560,627 | B1 | 5/2003 | McDonald et al. |
| 6,609,199 | B1 | 8/2003 | DeTreville |
| 6,615,278 | B1 | 9/2003 | Curtis |
| 6,633,963 | B1 | 10/2003 | Ellison et al. |
| 6,633,981 | B1 | 10/2003 | Davis |
| 6,651,171 | B1 | 11/2003 | England et al. |
| 6,678,825 | B1 | 1/2004 | Ellison et al. |
| 6,684,326 | B1 | 1/2004 | Cromer et al. |
| 7,155,629 | B2 * | 12/2006 | Lange-Pearson et al. .... 713/500 |
| 2001/0021969 | A1 | 9/2001 | Burger et al. |
| 2001/0027511 | A1 | 10/2001 | Wakabayashi et al. |
| 2001/0027527 | A1 | 10/2001 | Khidekel et al. |
| 2001/0037450 | A1 | 11/2001 | Metlitski et al. |
| 2002/0007456 | A1 | 1/2002 | Peinado et al. |
| 2002/0019951 | A1 * | 2/2002 | Kubo et al. ................ 713/400 |
| 2002/0023032 | A1 | 2/2002 | Pearson et al. |
| 2002/0147916 | A1 | 10/2002 | Strongin et al. |
| 2002/0166061 | A1 | 11/2002 | Falik et al. |
| 2002/0169717 | A1 | 11/2002 | Challener |
| 2003/0018892 | A1 | 1/2003 | Tello |
| 2003/0074548 | A1 | 4/2003 | Cromer et al. |
| 2003/0115453 | A1 | 6/2003 | Grawrock |
| 2003/0126442 | A1 | 7/2003 | Glew et al. |
| 2003/0126453 | A1 | 7/2003 | Glew et al. |
| 2003/0159056 | A1 | 8/2003 | Cromer et al. |
| 2003/0188179 | A1 | 10/2003 | Challener et al. |
| 2003/0196085 | A1 | 10/2003 | Lampson et al. |
| 2003/0214937 | A1 * | 11/2003 | Lindoff et al. ................ 370/350 |
| 2004/0003324 | A1 * | 1/2004 | Uhlig et al. ...................... 714/38 |
| 2004/0117539 | A1 | 6/2004 | Bennett et al. |
| 2004/0205368 | A1 * | 10/2004 | Lange-Pearson et al. .... 713/400 |
| 2004/0268347 | A1 * | 12/2004 | Knauerhase et al. ............. 718/1 |

FOREIGN PATENT DOCUMENTS

| | | |
|---|---|---|
| EP | 0473913 | 3/1992 |
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| JP | 05-158710 | 6/1993 |
| JP | 2000076139 | 3/2000 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9918511 | 4/1999 |
| WO | WO9957863 | 11/1999 |
| WO | WO9965579 | 12/1999 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175565 | 10/2001 |
| WO | WO0175595 | 10/2001 |
| WO | WO0201794 | 1/2002 |
| WO | WO9909482 | 1/2002 |
| WO | WO0217555 | 2/2002 |
| WO | WO02060121 | 8/2002 |
| WO | WO0175564 | 10/2002 |
| WO | WO02086684 | 10/2002 |
| WO | WO03058412 | 7/2003 |

OTHER PUBLICATIONS

Brands, Stefan, "Restrictive Blinding of Secret-Key Certificates" *Springer-Verlag XP002201306*, (1995),Chapter 3.

Chien, Andrew A., et al., "Safe and Protected Execution for the Morph/AMRM Reconfigurable Processor", *7th Annual IEEE Symposium, FCCM '99 Proceedings, XP010359180, ISBN 0-7695-0375-6*, Los Alamitos, CA, (Apr. 21, 1999),209-221.

Compaq Computer Corporation, "Trusted Computing Platform Alliance (TCPA) Main Specification Version 1.1a", *XP002272822*, (Jan. 25, 2001),1-321.

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986), 155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S., "Capability-Based Addressing", *Fabry, R.S., "Capability-Based Addressing," Communications of the ACM*, vol. 17, No. 7, (Jul. 1974),403-412.

Frieder, Gideon, "The Architecture And Operational Characteristics of the VMX Host Machine", *The Architecture and Operational Characteristics of the VMX Host Machine, IEEE*, (1982),9-16.

Goldberg, Robert P., "Survey of Virtual Machine Research", *Computer Magazine*, (Jun. 1974),34-35.

Gong, Li, et al., "Going Behind the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Heinrich, Joe, "MIPS R4000 Microprocessor User's Manual, Second Edition", *Chapter 4 "Memory Management"*, (Jun. 11, 1993),61-97.

HP Mobile Security Overview, "HP Mobile Security Overview", (Sep. 2002),1-10.

IBM, "Information Display Technique for a Terminate Stay Resident Program IBM Technical Disclosure Bulletin", *TDB-ACC-No. NA9112156*, vol. 34, Issue 7A, (Dec. 1, 1991), 156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel, "IA-32 Intel Architecture Software Developer's Manual", vol. 3: *System Programming Guide*, Intel Corporation—2003,13-1 through 13-24.

Intel, "Intel386 DX Microprocessor 32-Bit CHMOS Microprocessor With Integrated Memory Management", (1995),5-56.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Karger, Paul A., et al., "A VMM Security Kernal for the VAX Architecture", *Proceedings of the Symposium on Research in Security and Privacy*, XP010020182. ISBN 0-8186-2060-9, Boxborough, MA, (May 7, 1990),2-19.

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Lawton, Kevin, et al., "Running Multiple Operating Systems Concurrently on an IA32 PC Using Virtualization Techniques", http://www.plex86.org/research/paper.txt, (Nov. 29, 1999),1-31.

Luke, Jahn, et al., "Replacement Strategy for Aging Avionics Computers", *IEEE AES Systems Magazine*, XP002190614,(Mar. 1999).

Menezes, Alfred J., et al., "Handbook of Applied Cryptography", *CRC Press Series on Discrete Mathematices and its Applications*, Boca Raton, FL, XP002165287, ISBN 0849385237,(Oct. 1996),403-405, 506-515, 570.

Menezes, Alfred J., et al., "Handbook of Applied Cryptography", *CRC Press LLC*, USA XP002201307, (1997),475.

Motorola, "M68040 User's Manual", (1993),1-1 to 8-32.

Nanba, S., et al., "VM/4: ACOS-4 Virtual Machine 4 Virtual Machine Architecture", *VM/4: ACOS-4 Virtual Machine Architecture, IEEE*, (1985),171-178.

Richt, Stefan, et al., "In-Circuit-Emulator Wird Echtzeittauglich", *Elektronic Franzis Verlag GMBH*. Munchen, DE, vol. 40, No. 16, XP0002596220,(100-103),Aug. 6, 1991.

Robin, John S., et al., "Analysis of the Pentium's Ability to Support a Secure Virtual Machine Monitor", *Proceedings of the 9th USENIX Security Symposium*XP002247347, Denver, Colorado, (Aug. 14, 2000),1-17.

Rosenblum, M., "Virtual Platform: A Virtual Machine Monitor for Commodity PC", *Proceedings of the 11th Hotchips Conference*, (Aug. 17, 1999),185-196.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio, et al., "A Hardware Scheduler for Complex Real-Time Systems", *Proceedings of the IEEE International Symposium on Industrial Electronics*, XP002190615,(Jul. 1999),43-48.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptograpyhy: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449, ISBN 0471117099,(Oct. 1995),169-187.

Schneier, Bruce, "Applied Cryptography: Protocols, Algorithms, and Source Code in C", *2nd Edition; Wiley, John & Sons, Inc.*, XP002251738; ISBN 0471128457,(Nov. 1995),28-33;176-177;216-217; 461-473; 518-522.

Sherwood, Timothy, et al., "Patchable Instruction ROM Architecture", *Department of Computer Science and Engineering, University of California*, San Diego, La Jolla, CA, (Nov. 2001).

PCT Search Report mailed Feb. 28, 2006, 5 pages.

Franciscovich, J., "Natural/Adabas in VM/VSE," Online Jul. 9, 1997, available http://listserv.uark.edu/scripts/wa.exe?A2=ind9707&L=vmesa-1&P=7530>.

Hall, Judith S., et al., "Virtualizing the VAX Architecture," ACM SIGARCH Computer Architecture News, Proceedings of the 18th annual international symposium on Computer architecture, vol. 19, Issue No. 3, Apr. 1991, 10 pages.

"German Patent and Trademark Office Examination letter dated May 23, 2008", pp. 1-4.

"Microsoft Releases Microsoft Virtual PC 2004 to Manufacturing to Ease Customer Migration to Windows XP; Virtual Machine Solution Based on Connectix Technology Offers Customers a Sound, More Secure Migration Strategy for Critical Legacy Applications", Press Release: Redmond, Washington. *Microsoft Releases Microsoft Virtual PC 2004 to Manufacturing to Ease Customer Migration to Windwos XP. Microsoft.* (searched on May 23, 2008), (Nov. 10, 2003), pp. 1-2.

Abramson, Darren, et al., "Intel Virtualization Technology for Directed I/O", *Intel Technology Journal*, vol. 10, Issue 3., (Aug. 10, 2006), 179-192 plus coversheet.

First Office Action from counterpart Japan Patent Application No. 2007-539377, mailed Aug. 18, 2009, 3 pages.

Final Office Action from counterpart Japan Patent Application No. 2007-539377, mailed Feb. 23, 2010, 5 pages.

Notice of Reexamination for Patent Appeal from counterpart Japan Patent Application No. 2007-539377, mailed Jul. 14, 2010, 2 pages.

Isued Patent from counterpart Japan Patent Application No. 2007-539377, Issued on Sep. 10, 2010, 1 page.

Decision to Grant on Aug. 3, 2010, from counterpart Japan Patent Application No. 2007-539377, mailed Aug. 6, 2010, 1 page.

Decision of Refusal from counterpart German Patent Application No. 11 2005 002 347.8-53, mailed May 28, 2009, 13 pages.

Office Action from counterpart China Patent Application No. 200580035526.2 (PCT/US2005/040450), mailed Apr. 18, 2008, 15 pages.

Notice of Grant of Patent Right for Invention from counterpart China Patent Application No. 200580035526.2 (PCT/US2005/040450), mailed Dec. 19, 2008, 4 pages.

* cited by examiner

TIMER OFFSETTING MECHANISM IN A VIRTUAL MACHINE ENVIRONMENT

FIELD

Embodiments of the invention relate generally to virtual machines, and more specifically to a timer offsetting mechanism in a virtual machine environment.

BACKGROUND

Timers are typically used by operating systems and application software to schedule activities. For example, an operating system kernel may use a timer to allow a plurality of user-level applications to time-share the resources of the system (e.g., the central processing unit (CPU)). An example of a timer used on a personal computer (PC) platform is the 8254 Programmable Interval Timer. This timer may be configured to issue interrupts after a specified interval or periodically.

Another example of a timer is the timestamp counter (TSC) used in the instruction set architecture (ISA) of the Intel® Pentium® 4 (referred to herein as the IA-32 ISA). The TSC is a 64-bit counter that is set to 0 following the hardware reset of the processor, and then incremented every processor clock cycle, even when the processor is halted by the HLT instruction. The TSC cannot be used to generate interrupts. It is a time reference only, useful to measure time intervals. The IA-32 ISA provides an instruction (RDTSC) to read the value of the TSC and an instruction (WRMSR) to write the TSC. When WRMSR is used to write the time-stamp counter, only the 32 low-order bits may be written; the high-order 32 bits are cleared to 0. Because of these writing restrictions, software generally cannot set the TSC forward nor set it backwards to an arbitrary value.

In multi-processor (MP) systems, the TSC is used to properly synchronize processors and schedule processes appropriately. At boot time, the values of the TSC on all processors are synchronized and most operating systems assume that the TSC then count at the same rate. If the TSC values drift between processors (e.g., if one processor counts at a different rate that the others), scheduling of processes by the operating system may be confused.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
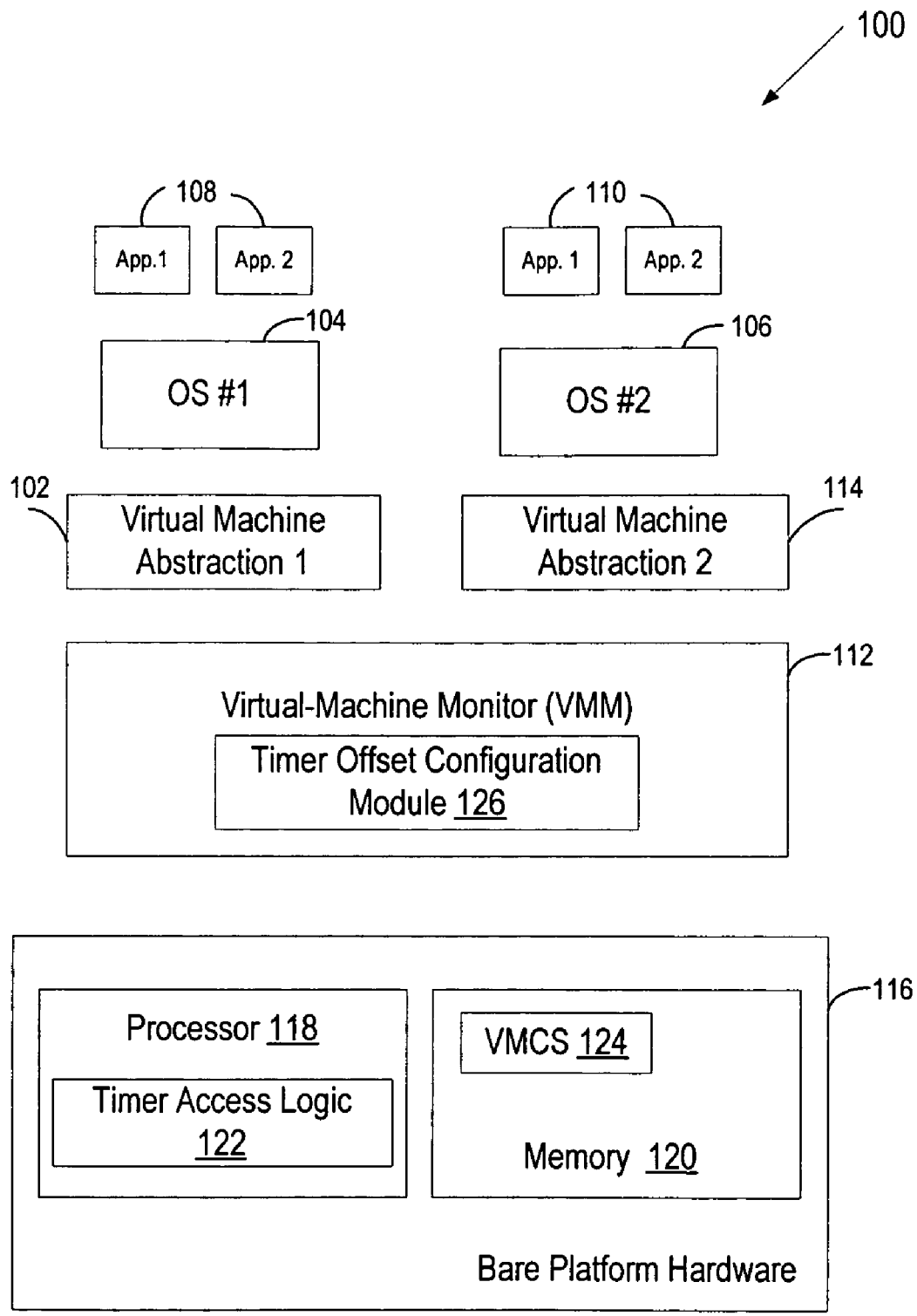
FIG. 1 illustrates one embodiment of a virtual-machine environment, in which the present invention may operate.

A method and apparatus for controlling access of virtual machines to a timer is described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe controlling access of virtual machine to a timer in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

Thus, a machine-readable medium may include any mechanism for storing or transmitting information in a form readable by a machine (e.g., a computer), but is not limited to, machine-readable storage mediums such as floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, and propagation mediums such as a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112.

The VMM 112, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 112 may be run within, or on top of, another VMM. VMMs may be implemented, for example, in hardware, software, firmware or by a combination of various techniques.

The platform hardware 116 can be of a personal computer (PC), mainframe, handheld device, portable computer, set-top box, or any other computing system. The platform hardware 116 includes a processor 118 and memory 120.

Processor 118 can be any type of processor capable of executing software, such as a microprocessor, digital signal processor, microcontroller, or the like. The processor 118 may include microcode, programmable logic or hardcoded logic for performing the execution of method embodiments of the present invention. Although FIG. 1 shows only one such processor 118, there may be one or more processors in the system.

Memory 120 can be a hard disk, a floppy disk, random access memory (RAM), read only memory (ROM), flash memory, any combination of the above devices, or any other type of machine medium readable by processor 118. Memory 120 may store instructions and/or data for performing the execution of method embodiments of the present invention.

The VMM 112 presents to other software (i.e., "guest" software) the abstraction of one or more virtual machines (VMs), which may provide the same or different abstractions to the various guests. FIG. 1 shows two VMs, 102 and 114. The guest software running on each VM may include a guest OS such as a guest OS 104 or 106 and various guest software applications 108 and 110. Each of the guest OSs 104 and 106 expects to access physical resources (e.g., processor registers, memory and I/O devices) within the VMs 102 and 114 on which the guest OS 104 or 106 is running and to perform other functions. For example, the guest OS 104 and 106 expects to have access to all registers, caches, structures, I/O devices, memory and the like, according to the architecture of the processor and platform presented in the VMs 102 and 114. The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed by guest software.

Further, each guest OS expects to handle various fault events such as exceptions (e.g., page faults, general protection faults, etc.), interrupts (e.g., hardware interrupts, software interrupts), and platform events (e.g., initialization (INIT) and system management interrupts (SMIs)). Some of these fault events are "privileged" because they must be handled by the VMM 112 to ensure proper operation of VMs 102 and 114 and for protection from and among guest software.

When a privileged fault event occurs or guest software attempts to access a privileged resource, control may be transferred to the VMM 112. The transfer of control from guest software to the VMM 112 is referred to herein as a VM exit. After facilitating the resource access or handling the event appropriately, the VMM 112 may return control to guest software. The transfer of control from the VMM 112 to guest software is referred to as a VM entry.

In one embodiment, the processor 118 controls the operation of the VMs 102 and 114 in accordance with data stored in a virtual machine control structure (VMCS) 124. The VMCS 124 is a structure that may contain the state of guest software, state of the VMM 112, execution control information indicating how the VMM 112 wishes to control operation of guest software, information controlling transitions between the VMM and a VM, etc. The processor 118 reads information from the VMCS 124 to determine the execution environment of the VM and to constrain its behavior. In one embodiment, the VMCS is stored in memory 120. In some embodiments, multiple VMCS structures are used to support multiple VMs.

The VMM 112 may need to use a timer to schedule resources, provide quality of service, assure security, and perform other functions. For example, in the instruction set architecture (ISA) of the Intel® Pentium® 4 (referred to herein as the IA-32 ISA), the VMM 112 may use the timestamp counter (TSC) to perform these functions. Each of the VMs 102 and 114 may also need to use the timer to calibrate timing loops and do performance optimization. Because the VMs 102 and 114 have no knowledge of each other or the VMM 112, the timer's values provided to the VM 102 or 114 may need to be adjusted to present the illusion that the guest OS 104 or 106 is running on a dedicated hardware platform, not a virtual platform. A timer offsetting mechanism is provided to properly virtualize the timer and thus preserve the illusion for the guest OSes 104 and 106. In one embodiment, the timer offsetting mechanism includes a timer offset configuration module 126 and timer access logic 122.

The timer offset configuration module 126 is responsible for providing values for fields associated with timer offsetting prior to requesting a transition of control to the VM 102 or 114. In one embodiment, these values may include an offset value specifying an offset to be used by the processor 118 when providing timer values to the VM 102 or 114 and a timer offsetting indicator specifying whether timer offsetting is enabled for the VM 102 or 114. In an embodiment, the timer offset value is a signed value, allowing the VMM 112 to present a timer value to guest software that is less than or greater than the actual hardware timer value. In one embodiment, the timer offset value is added to the timer value before returning the value to the VM 102 or 114. In one embodiment, the fields associated with timer offsetting also include a timer access control indicator specifying whether VM requests to access the timer are associated with a transition of control to the VMM (e.g., whether VM requests to access the timer should cause VM exits).

In one embodiment, the offset value for the VM 102 or 114 accounts for the aggregation of time intervals during which this VM was not running due to the execution of the VMM 112 and the other VM. For example, suppose that, when the timer's value is 1000 ticks, the VM 102 expects the value of the timer to be 1000. Then, at 1500 ticks, the VM 102 may be interrupted by a VM exit, following by the execution of the VMM 112 for 100 ticks (timer value of 1600 ticks), after which the VMM 112 may request to enter the VM 114. The VM 114 may then execute for 600 ticks (timer value of 2200 ticks) until a VM exit, resulting in the execution of the VMM 112 for 200 ticks (timer value 2400), which may then request to re-enter the VM 102. At the time of re-entry, the VM 102 expects the timer to have the value of 1500 ticks. Instead, the actual timer value at this time is 2400 ticks. The offset value provided by the VMM 112 for the VM 102 will be 900 ticks, which is the aggregation of time intervals during which the VM 112 was not running due to the execution of the VM 114 and the VMM 112. Hence, the VMM 112 would store the offset value of 900 to the timer offset field so that when the VM 102 attempts to read the timer, the value provided to the VM 102 will be computed by reducing the current timer value by 900. The offset value may also be calculated by computing the difference between the actual timer value and the timer value expected by the VM 102. In an alternative embodiment, the value provided to the VM 102 when it attempts to read the timer is computed by adding the current timer value to the offset value configured by the VMM 112. In this embodiment, the offset value stored by the VMM is a negative number. In the example described above, the value stored is −900.

As discussed above, in one embodiment, the offset value is determined by the VMM 112. In an alternative embodiment, the offset value is determined by the processor 118, and the fields and controls associated with timer offsetting may include a timer offsetting indicator, an adjust offset indicator, a guest timer field, a save timer indicator, and a timer offset field. In one embodiment, the three indicator values may be combined in a variety of ways. For example, the adjust offset indicator and the save timer indicator may be the same control (i.e., enabling the adjustment of the timer offset implicitly enables the saving of the timer), as will be described in more detail below. In some embodiments, some of the above indicators may not be present. For example, the timer offsetting indicator may not be present, and timer offsetting is assumed to be always enabled, as will be discussed in greater detail below.

In one embodiment, the fields and controls associated with timer offsetting are stored in the VMCS 124. Alternatively, the fields and controls associated with timer offsetting may reside in the processor 118, a combination of the memory 120 and the processor 118, or in any other storage location or locations. In one embodiment, separate fields and controls associated with timer offsetting are maintained for each of the VMs 102 and 114. Alternatively, the same fields and controls associated with timer offsetting are maintained for both VMs 102 and 144 and are updated by the VMM 112 before each VM entry.

In one embodiment, in which the system 100 includes multiple processors, multiple cores or multi thread processors, each of the multiple logical processors is associated with separate fields and controls associated with timer offsetting, and the VMM 112 configures the fields and controls associated with timer offsetting for each of the multiple logical processors.

In one embodiment, the processor 118 includes timer access logic 122 that is responsible for virtualizing accesses of the VM 102 and 114 to the timer based on the timer offsetting values. In particular, if the timer access logic 122 determines that timer offsetting is enabled, it provides an adjusted timer value to the VM 102 or 114. In one embodiment, the timer access logic 122 determines if timer offsetting is enabled by examining a timer offsetting indicator value. In one embodiment, when the timer access logic 122 receives a request for a current value of the timer from the VM 102 or 114, it reads the current value of the timer, adds the offset value to the current value of the timer, and returns the resulting value to the VM 102 or 114, thus presenting the VM 102 or 114 with the illusion that it is running on a dedicated hardware platform. In an embodiment, the offset value is a signed value.

The offset values may be determined for the VM 102 and 114 by the VMM 112 (e.g., by the timer offset configuration module 126). One embodiment of a process for determining an offset value by the VMM 112 will be discussed in greater detail below in conjunction with FIGS. 3 and 4. Alternatively, the offset values are determined by the processor 118 (e.g., by the timer access logic 122). One embodiment of a process for determining an offset value by the processor 118 will be discussed in more detail below in conjunction with FIG. 5.

Figure 2:
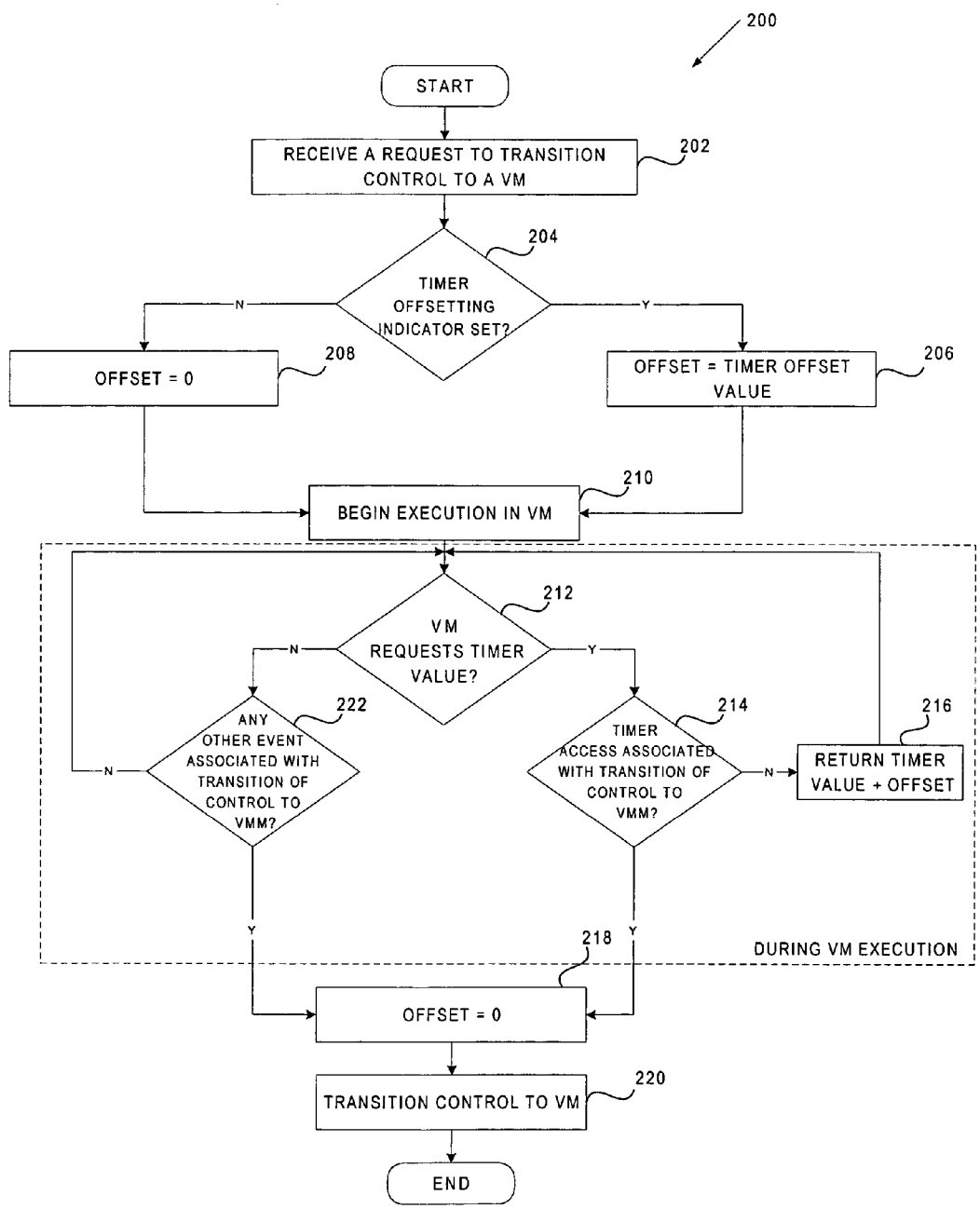
FIG. 2 is a flow diagram of one embodiment of a process for controlling access of VMs to a timer.

FIG. 2 is a flow diagram of one embodiment of a process 200 for controlling access of VMs to a timer. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 200 is performed by timer access logic 122 of FIG. 1.

Referring to FIG. 2, process 200 begins with processing logic receiving a request to transition control to a VM from a VMM (i.e., the request for VM entry) (processing block 202). In one embodiment, the VM entry request is received via a VM entry instruction executed by the VMM.

Next, processing logic determines whether timer offsetting is enabled (processing block 204). In one embodiment, processing logic makes this determination as part of the transition to the VM (e.g., when checking and loading VM state and execution control information stored in the VMCS). In one embodiment, the determination is based on the current value of a timer offsetting indicator stored in the VMCS for the VM being entered.

If timer offsetting is enabled, processing logic uses a timer offset value when responding to the requests of the VM for a current timer value. In one embodiment, the timer offset value is determined by the VMM prior to issuing the request to transition control to this VM. One embodiment of a process for determining the offset value by the VMM will be discussed in greater detail below in conjunction with FIGS. 3 and 4. Alternatively, the offset value is automatically determined by the processor when transitioning control to this VM. One embodiment of a process for determining the offset value by the processor will be discussed in more detail below in conjunction with FIG. 5.

In one embodiment, if timer offsetting is enabled, processing logic loads an offset register with the timer offset value stored in the VMCS (processing block 206). Alternatively, if timer offsetting is disabled, processing logic loads the offset register with 0 (processing block 208). Next, processing logic begins the execution in the VM (processing block 210).

During the VM's execution, processing logic may receive the VM's requests for a current value of the timer. In the IA-32 ISA, for example, the VM may issue a request for a current value of the TSC by executing the RDMSR instruction or a RDTSC instruction to read the TSC.

At processing box 212, processing logic determines whether the VM requests a current value of the timer. If so, then in one embodiment, processing logic determines whether this request is associated with a transition of control to the VMM (processing box 214). In one embodiment, a timer access control indicator may be set to an "exit" value to cause a VM exit on each request of the VM to access the timer. For example, in one embodiment, the timer access control indicator is a single bit, which if set to 1 indicates that requests of a VM to access the timer cause VM exits. In one embodiment, this indicator may be stored in the VMCS. If the request is not associated with a transition of control to the VMM, processing logic proceeds to processing block 216. If the request is associated with a transition of control to the VMM, processing logic transitions control to the VMM, indicating to the VMM that the VM exit was caused by an attempt to access the timer (processing block 220). In one embodiment, prior to transitioning control to the VMM, processing logic loads the offset register with 0 (processing block 218) to allow the VMM to obtain the actual value of the timer.

In another embodiment, a timer access control indicator is not used, and processing logic does not check for a transition of control to the VMM in response to VM requests for a current value of the timer. Instead, processing logic skips processing block 214 and proceeds directly to processing block 216.

At processing block 216, processing logic reads the current value of the timer, adds the offset value to the current value of the timer, and returns the result to the VM. In one embodiment, the timer offset value is a signed value that is combined with the content of the timer using signed addition.

During the execution of the VM, various other events associated with a VM exit (e.g., page faults, interrupts, etc.) may occur. In one embodiment, if processing logic detects an event associated with a VM exit (processing box 222), processing logic loads the offset register with 0 (processing block 218) and transitions control to the VMM, indicating the cause of the VM exit detected in processing block 222 (processing block 220). If processing logic does not detect any events associated with a VM exit, processing logic returns to processing box 212.

Figure 3:
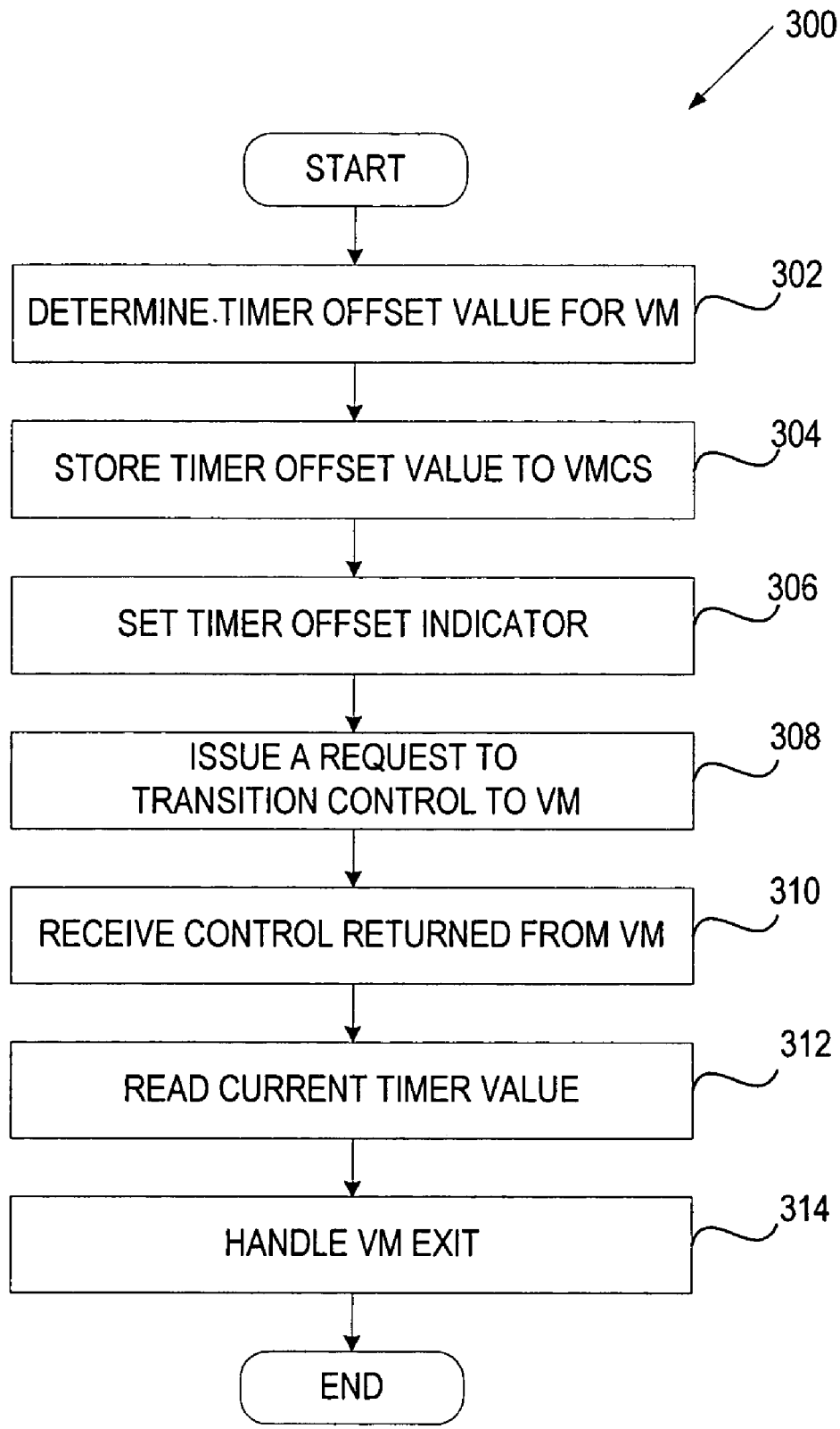
FIG. 3 is a flow diagram of one embodiment of a process for configuring fields associated timer offsetting.

FIG. 3 is a flow diagram of one embodiment of a process 300 for configuring fields associated with timer offsetting. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 300 is performed by a timer offset configuration module 126 of FIG. 1.

Referring to FIG. 3, process 300 begins with processing logic deciding that a transition of control to a VM is needed. Prior to issuing a request to transition control to the VM, processing logic determines a timer offset value for the VM (processing block 302) and stores the timer offset value in the VMCS (processing block 304). In one embodiment, the timer offset value is the aggregation of time intervals during which the VM being entered was not running due to the execution of the VMM and the other VMs. One embodiment of a process for calculating the timer offset value will be discussed in more detail below in conjunction with FIG. 4.

Next, processing logic sets a timer offset indicator to an enabling value (processing block 306) and issues a request to transition control to the VM (e.g., a VM entry request) (processing logic 308).

Subsequently, when a VM exit from the VM is generated, processing logic receives control back (processing block 310), determines the current value of the timer (processing block 312), and handles the VM exit as needed (e.g., perform operations addressing the cause of the VM exit) (processing block 314). As described below, the value of the timer at VM exit may be used to calculate the timer offset before returning control to the VM.

Figure 4:
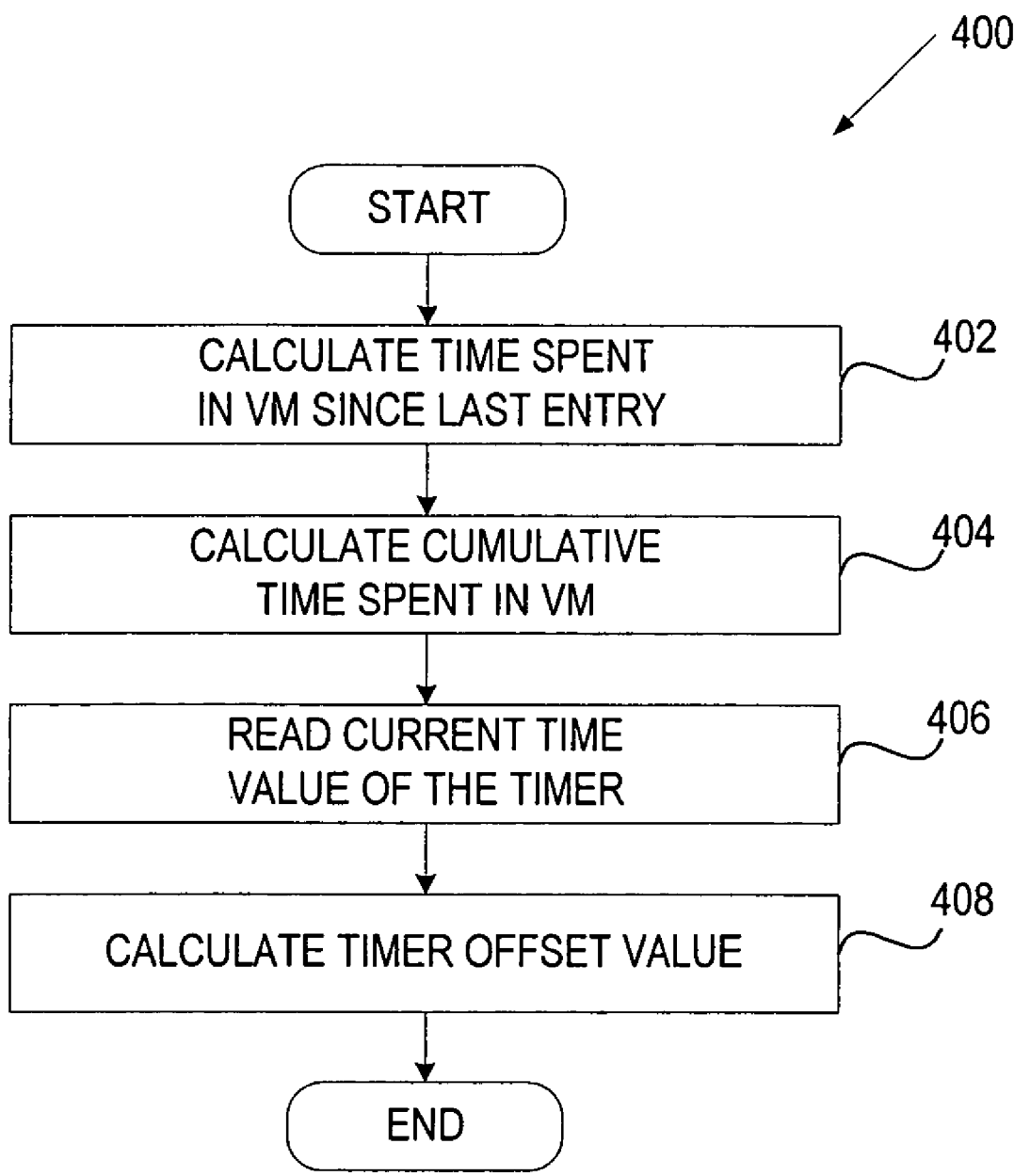
FIGS. 4 and 5 are flow diagrams of two alternative embodiments of a process for calculating a timer offset value for a VM.

FIG. 4 is a flow diagram of one embodiment of a process 400 for calculating a timer offset value for a VM (as referenced in processing block 302 of FIG. 3 for example). The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 400 is performed by a timer offset configuration module 126 of FIG. 1.

Referring to FIG. 4, process 400 begins with processing logic calculating the time spent in this VM since the last VM entry (processing block 402). In one embodiment, this time is calculated by determining a VM-entry time (i.e., the timer value just prior to issuing a request to enter the VM) and a VM-exit time (e.g., the timer value at the time of receiving control returned from the VM), and subtracting the VM-entry time from the VM-exit time.

At processing block 404, processing logic calculates the cumulative time spent in the VM by adding the time spent in the VM during the last entry to the previously calculated cumulative time. In one embodiment, processing logic calculates the cumulative time spent in the VM when receiving control returned from the VM. Alternatively, processing logic calculates the cumulative time spent in the VM when issuing a request to return control to this VM.

When processing logic decides to return control to the VM, it reads the current value of the timer (processing block 406), and calculates the timer offset value as a difference between the cumulative time spent in the VM and the current value of the timer (processing block 408). In one embodiment, the timer offset value is a signed value.

Figure 5:
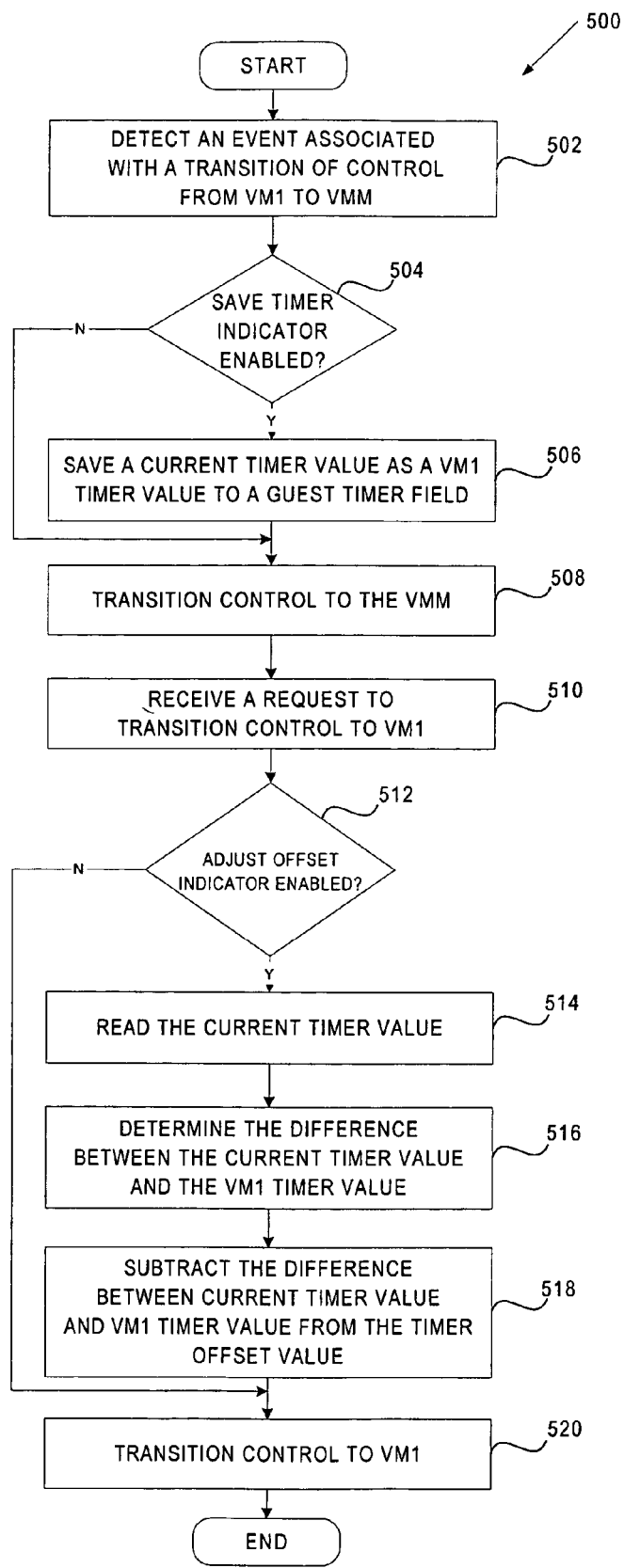

FIG. 5 is a flow diagram of an alternative embodiment of a process for calculating a timer offset value for a VM. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 500 is performed by timer offset logic 122 of FIG. 1.

Referring to FIG. 5, process 500 begins with processing logic detecting an event associated with a transition of control from VM1 to the VMM (processing block 502).

At processing block 504, processing logic determines whether a save timer indicator is enabled. In one embodiment, the save timer indicator is configured by the VMM and stored in the VMCS.

If the save timer indicator is enabled, processing logic saves a current timer value as a VM1 timer value to a guest timer field (processing block 506) and proceeds to processing block 508. In one embodiment, the guest timer field is stored in the VMCS.

If the save timer indicator is disabled, processing logic skips processing block 506 and proceeds directly to processing block 508.

At processing block 508, processing logic transitions control to the VMM.

Subsequently, at processing block 510, processing logic receives a request to return control to VM1. In response, processing logic determines whether an adjust offset indicator is enabled (processing block 512). In one embodiment, the adjust offset indicator is configured by the VMM and stored in the VMCS. In another embodiment, the save timer indicator and the adjust offset indicator are represented by the same indicator which is checked both at processing blocks 504 and 512. In another embodiment, a timer offsetting indicator may be evaluated to determine if timer offsetting should be used. In one embodiment, the timer offsetting indicator is configured by the VMM and stored in the VMCS.

If the adjust offset indicator is enabled, processing logic reads the current timer value (processing block 514), and determines the difference between the current timer value and the VM1 timer value saved at processing block 506 by subtracting the saved VM1 timer value from the current timer value (processing block 516). Further, processing logic calculates the adjusted timer offset value by subtracting this difference from the timer offset value in the timer offset field (processing block 518). In one embodiment, this adjusted timer offset value is stored to the timer offset field. Next, processing logic transitions control to VM1 (processing block 520).

If the adjust offset indicator is disabled, in one embodiment, processing logic skips processing blocks 514 through 518 and proceeds directly to processing block 520. In another embodiment, if the adjust offset indicator is disabled, processing logic retrieves the value of timer offset field for use as the adjusted timer offset value and then proceeds to processing block 520.

In an alternative embodiment, at VM exit, a virtual guest timer value is calculated (by computing the sum of the current timer offset value and the current value of the timer) and stored to a virtual guest timer field. In one embodiment, the virtual guest timer field is stored in the VMCS. Subsequently, at VM entry, the offset value is computed by subtracting the timer value at the time of the VM entry from the virtual guest timer value. While the VM executes, attempts to read the timer will return the current value of the timer adjusted by the offset value.

Thus, a method and apparatus for controlling access of VMs to a timer have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a request to transition control of a guest software from a virtual machine monitor (VMM) to an existing first virtual machine (VM), the first VM and VMM residing at an application server of a computer system;
   transitioning control to the first VM upon receiving the request from the VMM;
   calculating an offset value, the offset value being an aggregate value of time intervals during which the first VM being used was not running due to an execution of the VMM or a second VM, wherein calculating the offset value comprises determining a difference between a timer value read upon receiving the request to transition control to the VM and a timer value saved upon detecting a prior event associated with a transition of control from the VM to the VMM, and subtracting the difference from a value of a timer offset field;
   during execution of the first VM, adjusting a current value of a timer based on the difference between the current value and the calculated offset value; and
   providing the adjusted timer value to the first VM.

2. The method of claim 1 further comprising storing the calculated timer offset value to the timer offset field.

3. The method of claim 1 further comprising: determining that an adjust timer offset indicator is set to an enabled value prior to determining the difference.

4. The method of claim 1 further comprising:
   determining that an adjust timer offset indicator is set to a disabled value; and
   reading a timer offset field, a value of the timer offset field being subsequently used as the offset value.

5. The method of claim 1 wherein the timer value is saved upon detecting the prior event associated with the transition of control to the VMM if a save timer indicator is enabled.

6. The method of claim 1 further comprising:
   determining that a timer access control indicator is set to an exit value; and
   transitioning control to the VMM in response to the request.

7. The method of claim 1 further comprising:
   determining that offsetting of the timer is disabled; and
   loading an offset register with zero.

8. A system comprising:
   a computer system having a memory and a processor coupled with the memory, the memory including a first virtual machine (VM) and a virtual machine monitor (VMM), the computer system further having an application server, the application server to:
   receive a request to transition control of a guest software from the VMM to the first VM, the first VM and VMM residing at an application server of a computer system; and
   calculate an offset value being an aggregate value of time intervals during which the first VM being used was not running due to an execution of the VMM or a second VM, and, during the execution of the first VM, adjust a current value of a timer based on the difference between the current value and the calculated offset value, wherein the offset value is calculated by determining a difference between a timer value read upon receiving the request to transition control to the VM and a timer value saved upon detecting a prior event associated with a transition of control from the VM to the VMM, and subtracting the difference from a value of a timer offset field; and provide the adjusted timer value to the first VM.

9. The system of claim 8 wherein the application server is further modified to provide a timer offset field storing the calculated timer offset value.

10. The system of claim 8 wherein the application server is further modified to include an adjust timer offset indicator.

11. The system of claim 10 wherein the application server is further modified to determine that the adjust timer offset indicator is set to an enabled value prior to determining the difference.

12. The system of claim 8 wherein the application server is further modified to determine that an adjust timer offset indicator is set to a disabled value, and to read a timer offset field, a value of the timer offset field being subsequently used as the offset value.

13. The system of claim 8 wherein the application server is further modified to store a save timer indicator used by the timer access logic to determine whether to save the timer value upon detecting the prior event associated with the transition of control to the VMM.

14. A non-transitory machine-readable storage medium containing instructions which, when executed, cause a machine to:

receive a request to transition control of a guest software from a virtual machine monitor (VMM) to an existing first virtual machine (VM), the first VM and VMM residing at an application server of a computer system;

calculate an offset value, the offset value being an aggregate value of time intervals during which the first VM being used was not running due to an execution of the VMM or a second VM, wherein the offset value is calculated by determining a difference between a timer value read upon receiving the request to transition control to the VM and a timer value saved upon detecting a prior event associated with a transition of control from the VM to the VMM, and subtracting the difference from a value of a timer offset field;

during execution of the first VM, adjust a current value of a timer based on the difference between the current value and the calculated offset value; and provide the adjusted timer value to the first VM.

15. The non-transitory machine-readable storage medium of claim 14 wherein the timer value is read upon receiving the request to transition control to the VM if an adjust timer offset indicator is enabled.

16. The non-transitory machine-readable storage medium of claim 14 wherein the timer value is saved upon detecting the prior event associated with the transition of control to the VMM if a save timer indicator is enabled.

\* \* \* \* \*